(12) United States Patent
Hagiwara et al.

(10) Patent No.: US 12,216,134 B2
(45) Date of Patent: Feb. 4, 2025

(54) AUTOMATIC ANALYZER AND METHOD THEREOF

(71) Applicant: Hitachi High-Tech Corporation, Tokyo (JP)

(72) Inventors: Takaaki Hagiwara, Tokyo (JP); Teruhiro Yamano, Tokyo (JP); Kazunori Yamazawa, Tokyo (JP); Taku Sakazume, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 1033 days.

(21) Appl. No.: 17/267,148

(22) PCT Filed: Jul. 3, 2019

(86) PCT No.: PCT/JP2019/026440
§ 371 (c)(1),
(2) Date: Feb. 9, 2021

(87) PCT Pub. No.: WO2020/044781
PCT Pub. Date: Mar. 5, 2020

(65) Prior Publication Data
US 2022/0011326 A1     Jan. 13, 2022

(30) Foreign Application Priority Data

Aug. 28, 2018   (JP) .................... 2018-158977

(51) Int. Cl.
*G01N 35/00* (2006.01)
(52) U.S. Cl.
CPC ............... *G01N 35/0095* (2013.01); *G01N 2035/00356* (2013.01); *G01N 2035/0094* (2013.01)

(58) Field of Classification Search
CPC ..... G01N 35/0095; G01N 2035/00356; G01N 2035/0094
See application file for complete search history.

(56) References Cited

U.S. PATENT DOCUMENTS 8,926,903 B2 * 1/2015 Nogami ................. G01N 1/405
422/65
11,262,372 B2 * 3/2022 Shibuya ........... G01N 35/00871
(Continued)

FOREIGN PATENT DOCUMENTS

JP          05-164763 A      6/1993

OTHER PUBLICATIONS

International Search Report of PCT/JP2019/026440 dated Sep. 17, 2019.

*Primary Examiner* — Shogo Sasaki
(74) *Attorney, Agent, or Firm* — MATTINGLY & MALUR, PC

(57) ABSTRACT

In a case where plural measurement items that require different incubation times are simultaneously measured in an automatic analyzer, deterioration of the turnaround time of the measurement is minimized. The automatic analyzer receives a request of a sample, obtains a ratio of a short measurement item among examination items of the received analysis request, and a determines an empty cycle based on the ratio of the short measurement item and the number of schedules. When an empty cycle is necessary, the empty cycle is scheduled in a schedule of a sample that is requested to be measured first, for example, an empty cycle in a short measurement for making an incubator empty. As a result, this position can be used for a measurement of a short measurement item such that the wait time of the start of the measurement can be short.

7 Claims, 9 Drawing Sheets

(56) References Cited

U.S. PATENT DOCUMENTS

| | | | |
|---|---|---|---|
| 11,486,890 B2* | 11/2022 | Imai | G01N 35/1004 |
| 11,506,675 B2* | 11/2022 | Masuya | G01N 21/51 |
| 11,519,924 B2* | 12/2022 | Ebihara | G01N 35/00 |
| 11,555,824 B2* | 1/2023 | Hashimoto | G01N 35/1002 |
| 11,565,266 B2* | 1/2023 | Watanabe | G01N 35/0092 |
| 11,639,943 B2* | 5/2023 | Imai | G01N 35/1002 |
| | | | 422/65 |
| 2003/0040117 A1* | 2/2003 | Devlin, Sr. | G01N 35/0092 |
| | | | 436/46 |
| 2003/0054557 A1 | 3/2003 | Devlin, Sr. | |
| 2004/0185549 A1* | 9/2004 | Fujita | G01N 35/025 |
| | | | 435/287.2 |
| 2010/0254857 A1* | 10/2010 | Mazume | G01N 35/04 |
| | | | 134/113 |
| 2011/0293477 A1 | 12/2011 | Yamazawa et al. | |

* cited by examiner

[FIG. 1]
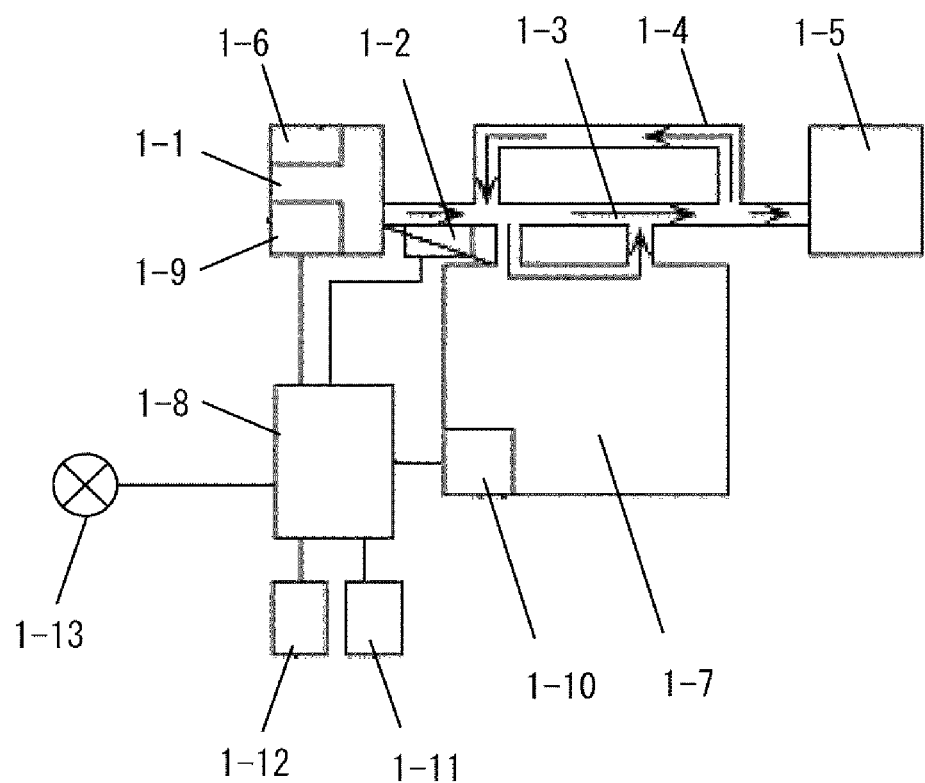

[FIG. 2]
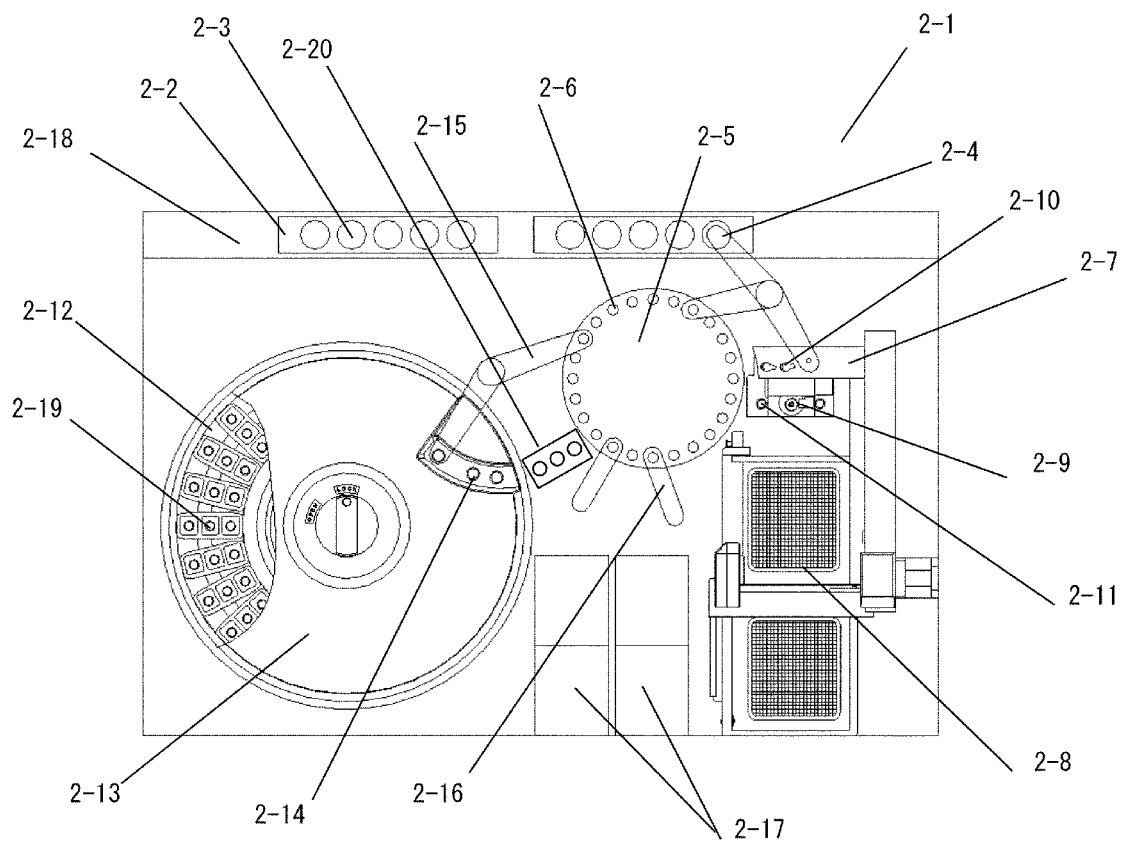

[FIG. 3]
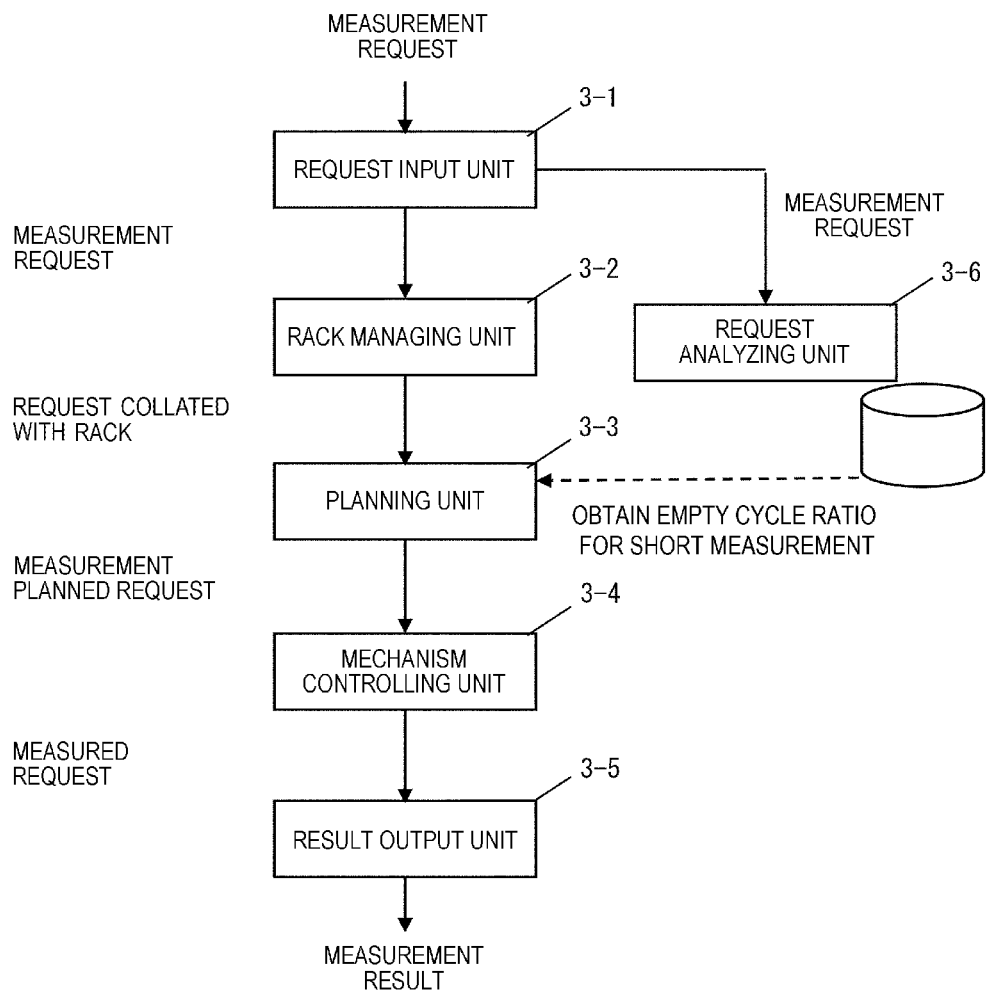

[FIG. 4]
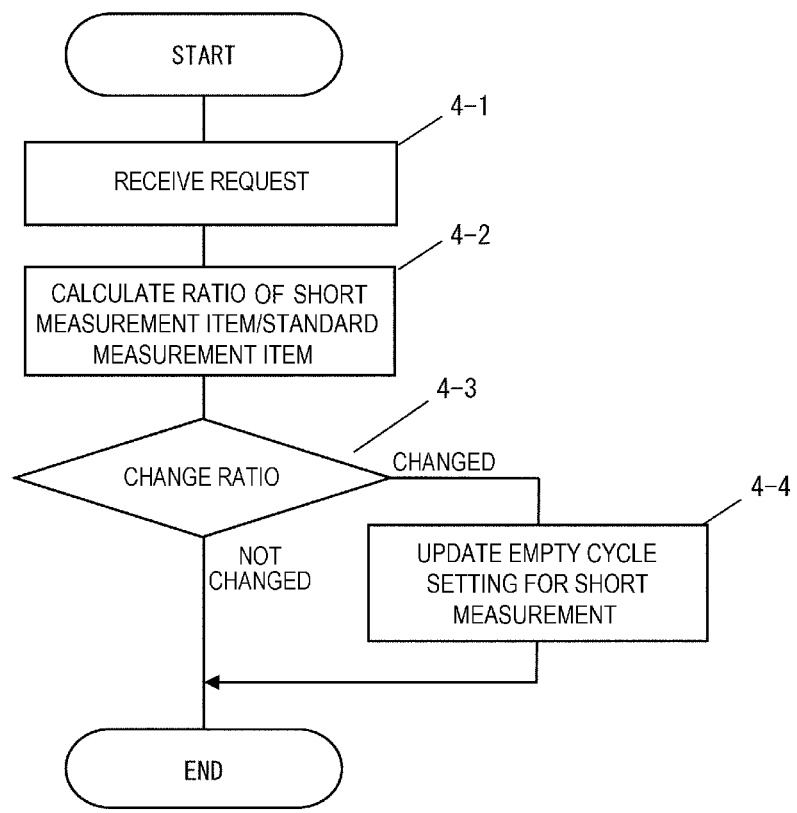

[FIG. 5]
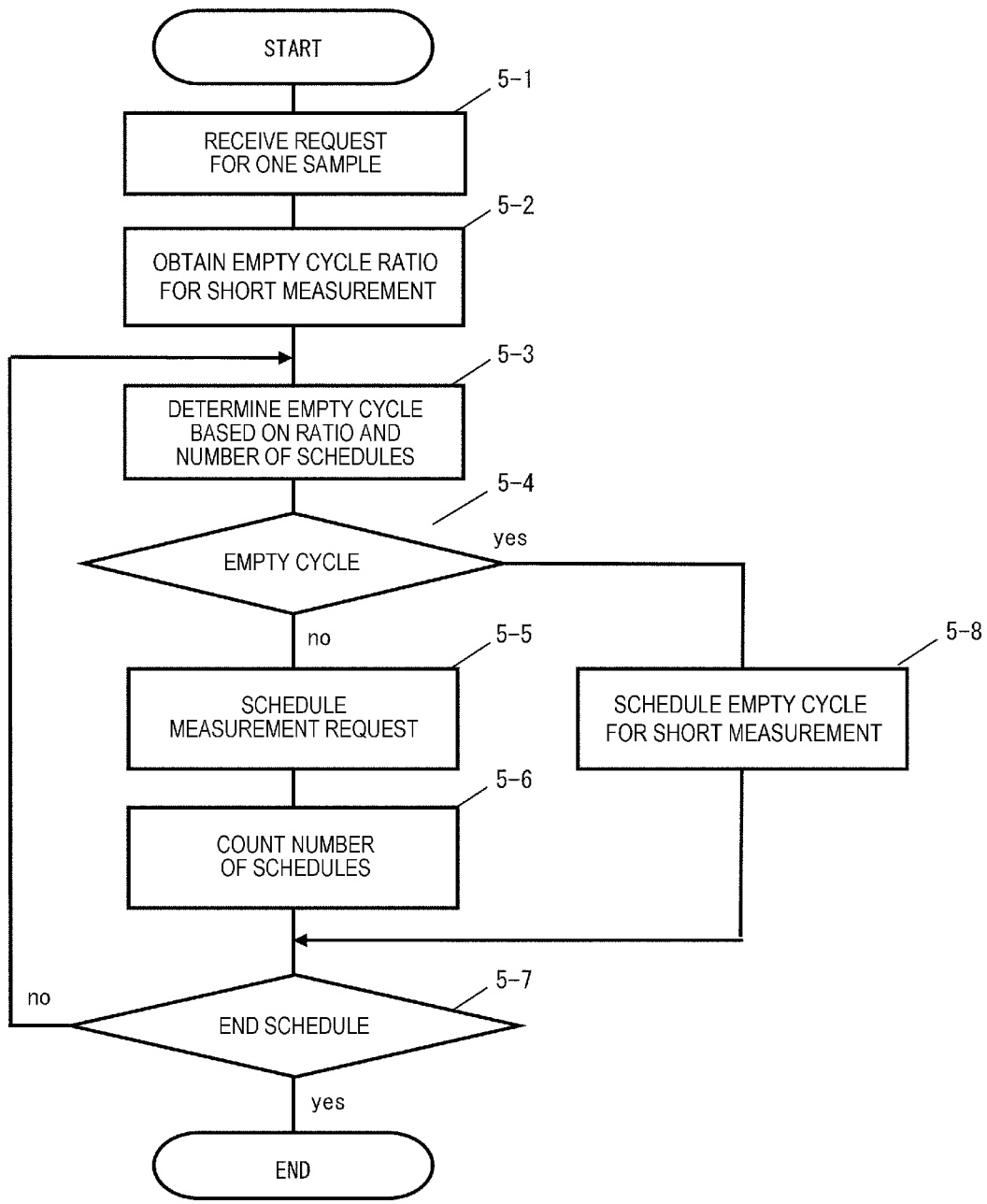

[FIG. 6]
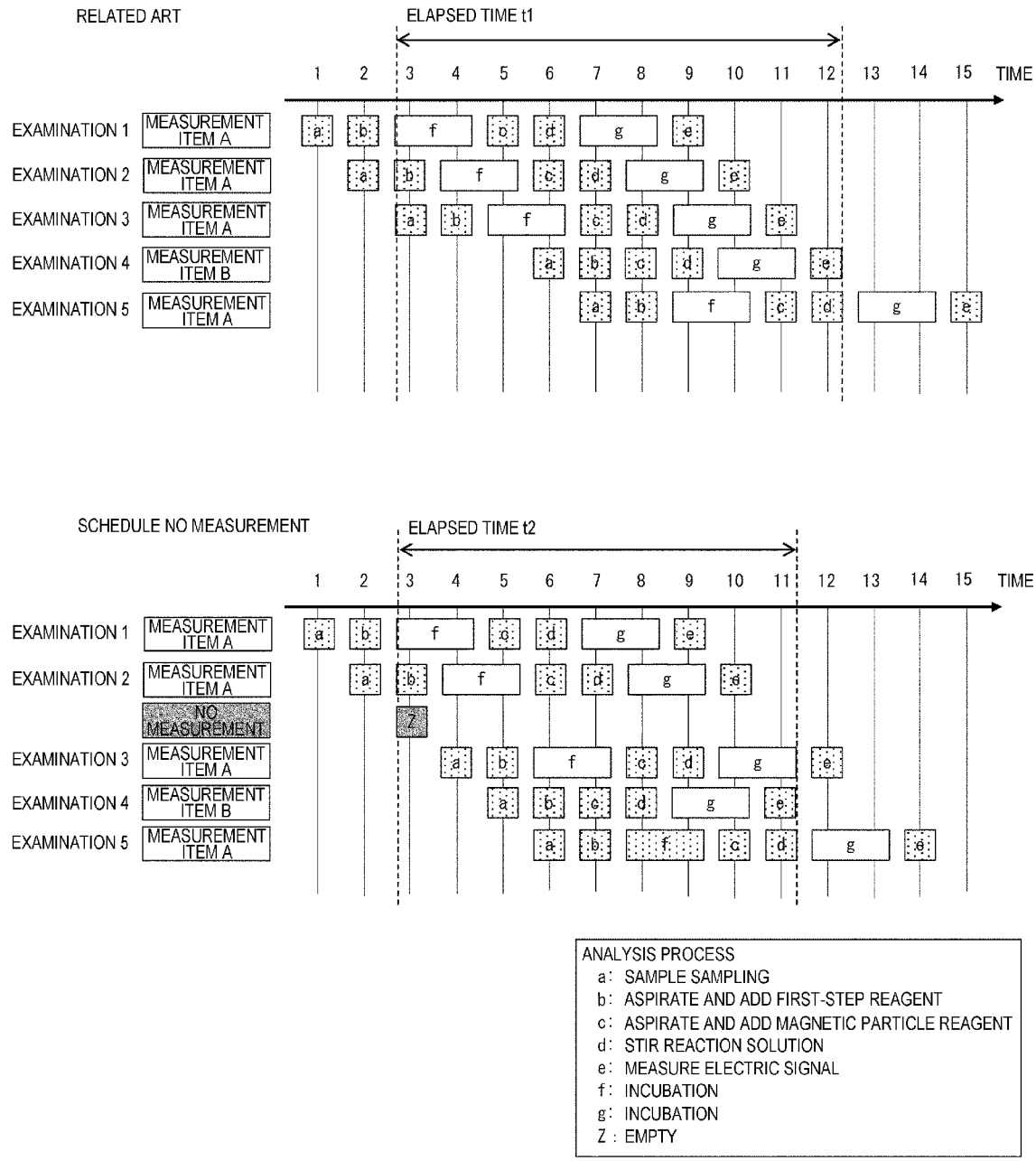

[FIG. 7]
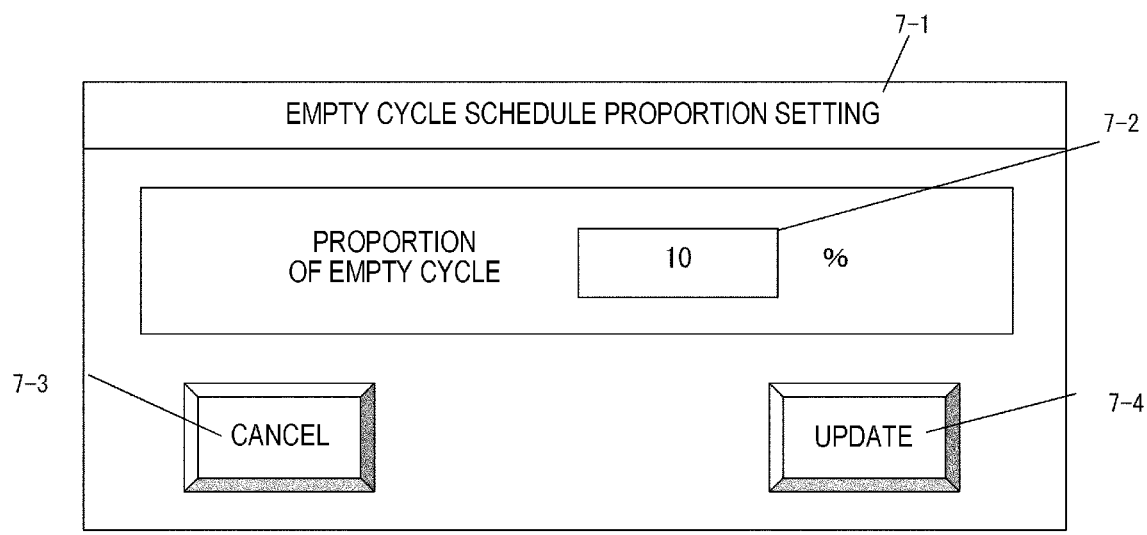

[FIG. 8]
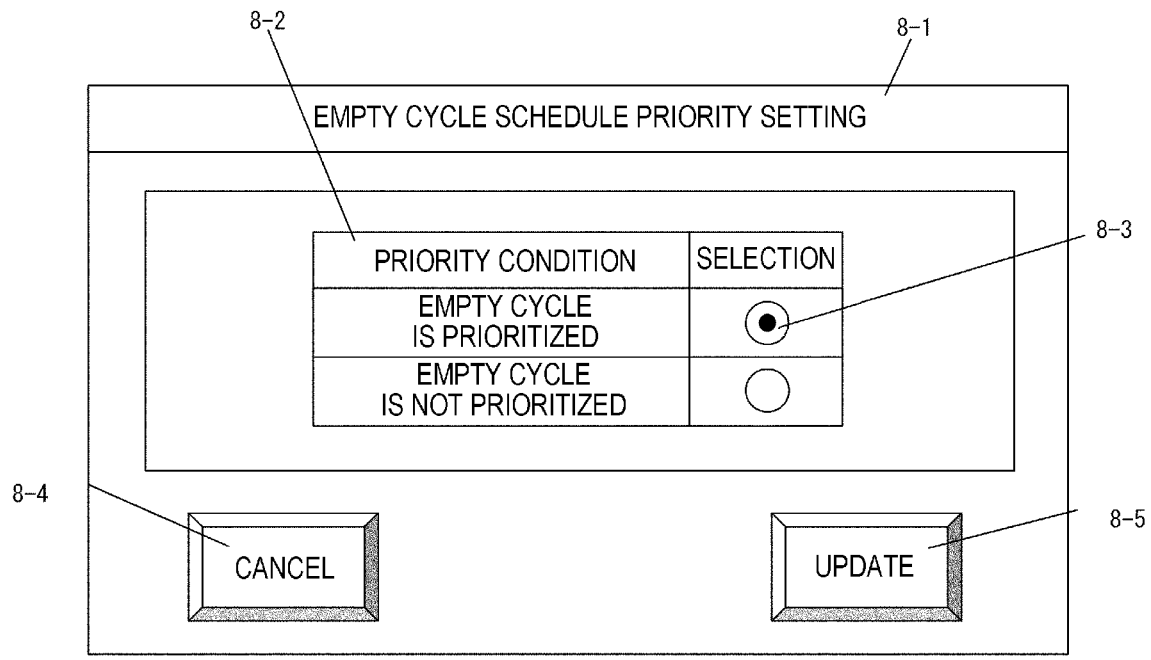

[FIG. 9]
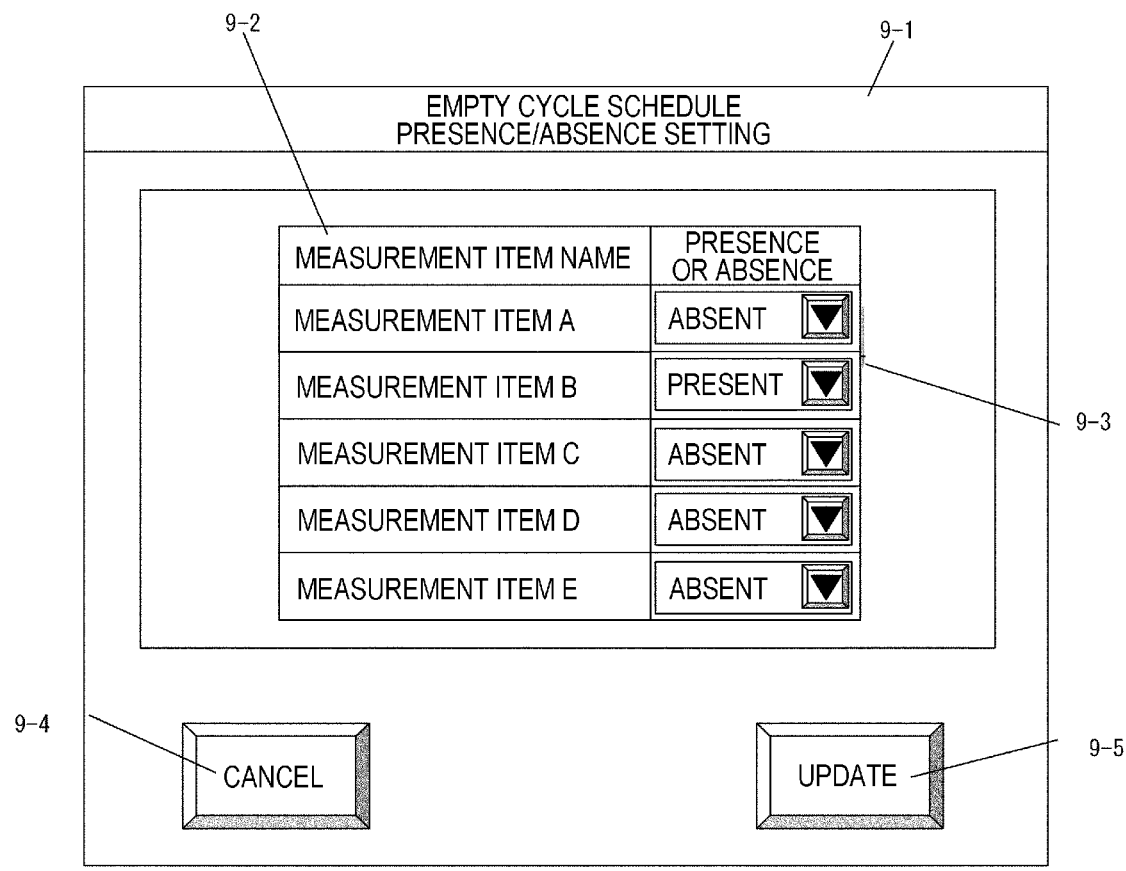

AUTOMATIC ANALYZER AND METHOD THEREOF

TECHNICAL FIELD

The present invention relates to an automatic analyzer and a method thereof.

BACKGROUND ART

An automatic analyzer that analyzes biological samples such as blood and urine with a reagent typically has a measurement sequence including a series of operations such as sample sampling, addition of reagents, stirring, incubation, and measurement of an electrical signal for analyzing a target component in a sample, and sequentially analyzes a plurality of measurement items in parallel by shifting a start timing of the measurement sequence by a fixed time and starting the measurement sequence discretely. Patent Literature 1 shows an example of such an automatic analyzer. Normally, one type of the automatic analyzer has a corresponding measurement sequence. In the related art, although there is also a technique of measuring a plurality of items having different reagent addition timing and time required for a reaction (hereinafter, referred to as an incubation time), this is also a method in which a maximum number of a reagent addition timing and a maximum reaction time are ensured in advance and a part of the reagent addition timing and the reaction time is omitted as necessary. Thus, this technique substantially repeats the same pattern of measurement sequence.

On the other hand, there is provided an automatic analyzer that enables a plurality of different measurement sequences to be operated by one automatic analyzer in order to prevent a decrease in a throughput. Such an automatic analyzer has a check function to avoid a duplicate use and an operation interference of mechanical equipment, has a plurality of operation methods for a transport mechanism to transport a reaction container to the mechanical equipment, and switches these operation methods as necessary. An example of such an automatic analyzer is shown in Patent Literature 2.

CITATION LIST

Patent Literature

Patent Literature 1: JP-A-H05-164763
Patent Literature 2: JP-A-2010-151710

SUMMARY OF INVENTION

Technical Problem

In recent years, with a progress of a reagent for analyzing blood, urine, and the like, various health examinations and emergency tests have been diversified. Therefore, a plurality of measurement sequences for analyzing target components have also been developed. Correspondingly, an analyzer in the related art enables the plurality of different measurement sequences to be operated as described above, has a check function of avoiding the duplicate use and the operation interference of the mechanical equipment, has a plurality of operation methods for the transport mechanism to transport the reaction container to the mechanical equipment, and switches these operation methods as necessary to perform measurement.

Even in such an analyzer, one measurement is performed sequentially from the sample being set at a dispensing position. Therefore, when a plurality of measurement items having different incubation times are simultaneously measured, it is often necessary to avoid a duplicate use and an operation interference of limited mechanical equipment. For example, in a schedule of a container holder, when there is a measurement sequence 1 in which time required for a reaction is T1 (for example, ten minutes) and a measurement sequence 2 in which time required for a reaction is T2 (for example, five minutes), the measurement sequence 2 uses the container holder at a position where T1–T2 has passed in measurement sequence 1. Therefore, when the measurement sequence 1 is performed continuously, T1–T2 (for example, ten minutes–five minutes=five minutes) will be necessary for a schedule of the measurement sequence 2 to be established. As a result, a turnaround time of the measurement sequence 2 becomes T1 which is the same as that of the measurement sequence 1 and deteriorates. Accordingly, even in a measurement sequence in which a measurement result can be obtained in half the time, a turnaround time as in the related art may be required, which is a problem to be solved.

In order to solve the above problem, an object of the invention is to provide an automatic analyzer capable of efficiently measuring a plurality of measurement items having different incubation time and capable of preventing deterioration of a turnaround time of a measurement, and a method thereof.

Solution to Problem

In order to achieve the above object, the invention provides an automatic analyzer including: an incubator that includes a plurality of holding portions holding a plurality of reaction containers and promotes a reaction of a mixed solution of a sample and a reagent, the reaction containers containing the mixed solution; a receiving unit that receives analysis information relating to a measurement item of the sample; a transport unit that transports each of the reaction containers to the holding portion; an analyzing unit that performs analysis by operating a measurement sequence of a predetermined reaction time on each of the reaction containers containing the mixed solution to which a predetermined reagent is added at a predetermined timing based on the analysis information; a planning unit that creates an analysis schedule to be performed by the analyzing unit based on the analysis information, wherein in an analysis of a plurality of different measurement items, the planning unit estimates and creates the analysis schedule according to a plurality of different measurement sequences such that the different measurement sequences are capable of being performed.

In order to achieve the above object, the invention provides an automatic analysis method of an automatic analyzer, the automatic analyzer including: an incubator that includes a plurality of holding portions holding a plurality of reaction containers and promotes a reaction of a mixed solution of a sample and a reagent, the reaction containers containing the mixed solution; and an analyzing unit that performs analysis on the mixed solution contained in each of the reaction containers by installing the reaction container, in which the predetermined reagent is added to the sample at a predetermined timing based on analysis information relating to a measurement item of the sample, in the holding portion and operating a measurement sequence at a predetermined reaction time, wherein in a case where an analysis schedule to be performed by the analyzing unit based on analysis information of the sample that is requested to be measured is created, in order to analyze a plurality of different measurement items, an analysis schedule of an analysis target is estimated and created according to a plurality of different measurement sequences of the measurement items such that the different measurement sequences are capable of being performed.

Advantageous Effect

According to the invention, a turnaround time of a short measurement item can be shortened by scheduling an empty cycle, which can contribute to early diagnosis.

BRIEF DESCRIPTION OF DRAWINGS

FIG. 1 is a system block diagram illustrating an overall configuration example of an automatic analyzer.

FIG. 2 is a diagram illustrating one configuration example of an analysis module of the automatic analyzer.

FIG. 3 is a functional block diagram of a computer of the analysis module.

FIG. 4 is a diagram illustrating process flows of a request analyzing unit as one functional block.

FIG. 5 is a diagram illustrating process flows of a planning unit as one functional block.

FIG. 6 is a diagram illustrating an effect of reducing an elapsed time required to obtain the measurement result of a short measurement item.

FIG. 7 is a diagram illustrating an example of an empty cycle schedule proportion setting screen.

FIG. 8 is a diagram illustrating an example of an empty cycle schedule priority setting screen.

FIG. 9 is a diagram illustrating an example of an empty cycle schedule presence/absence setting screen.

DESCRIPTION OF EMBODIMENTS

Hereinafter, a preferred embodiment for implementing the invention will be described with reference to FIGS. 1 to 9. In the present description, there are different measurement items, that is, a short measurement item that requires a short period of time for a reaction (hereinafter, referred to as a short measurement item), and a standard measurement item that requires a standard period of time for a reaction (hereinafter, referred to as a standard measurement item) as types of a measurement sequence. The latter may be called a normal item.

First Embodiment

The first embodiment is an embodiment of an automatic analyzer including: an incubator that includes a plurality of holding portions holding a plurality of reaction containers and promotes a reaction of a mixed solution of a sample and a reagent, the reaction containers containing the mixed solution; a receiving unit that receives analysis information relating to a measurement item of the sample; a transport unit that transports each of the reaction containers to the holding portion; an analyzing unit that performs analysis by operating a measurement sequence of a predetermined reaction time on each of the reaction containers containing the mixed solution to which a predetermined reagent is added at a predetermined timing based on the analysis information; a planning unit that creates an analysis schedule to be performed by the analyzing unit based on the analysis information. In an analysis of a plurality of different measurement items, the planning unit estimates and creates the analysis schedule according to a plurality of different measurement sequences such that the different measurement sequences are capable of being performed.

In addition, the first embodiment is an embodiment of an automatic analysis method of an automatic analyzer, the automatic analyzer including: an incubator that includes a plurality of holding portions holding a plurality of reaction containers and promotes a reaction of a mixed solution of a sample and a reagent, the reaction containers containing the mixed solution; and an analyzing unit that performs analysis on the mixed solution contained in each of the reaction containers by installing the reaction container, in which the predetermined reagent is added to the sample at a predetermined timing based on analysis information relating to a measurement item of the sample, in the holding portion and operating a measurement sequence at a predetermined reaction time. In a case where an analysis schedule to be performed by the analyzing unit based on analysis information of the sample that is requested to be measured is created, in order to analyze a plurality of different measurement items, an analysis schedule of an analysis target is estimated and created according to a plurality of different measurement sequences of the measurement items such that the different measurement sequences are capable of being performed.

FIG. 1 is a system block diagram illustrating an overall configuration example of an automatic analyzer according to the first embodiment. The automatic analyzer includes a sample rack loading unit 1-1, an identifier (ID) reading unit 1-2, a transport line 1-3, a reexamination transport line 1-4, an analysis module 1-7, a sample rack collecting unit 1-5, and a computer for overall management 1-8.

The sample rack loading unit 1-1 is a unit that loads a plurality of sample racks into the automatic analyzer. A calibrator storing unit 1-6 is a mechanism that can store a reagent used for calibration and automatically load a calibrator upon a request. The analysis module 1-7 is located along the transport line 1-3 and is detachably connected to the transport line 1-3.

The analysis module 1-7 includes a computer 1-10 for an analysis module that functions as a control unit that performs a necessary processing control inside thereof. In addition, the sample rack loading unit 1-1 includes a computer 1-9 that performs a necessary control on the sample rack loading unit 1-1, the transport line 1-3, the reexamination transport line 1-4 and the sample rack collecting unit 1-5. These computers 1-9 and 1-10, and the ID reading unit 1-2 are connected to the computer for overall management 1-8. The computer for overall management 1-8 is connected to an operation unit 1-12 that inputs further necessary information, a display unit 1-11 that displays an analysis result, and an external network 1-13. The computer for overall management 1-8, and the computers 1-9 and 1-10 each have a normal computer configuration, and include a central processing unit (CPU), a storage unit (memory), an input/output unit, a network interface, etc. In addition, the computer for overall management 1-8 and the computers 1-9 and 1-10 may implement functions of all control units with one computer without preparing three independent computers.

Next, a configuration example of the analysis module of the present embodiment will be described with reference to FIG. 2. Inside an analysis module 2-1 corresponding to the analysis module 1-7 in FIG. 1, a rack 2-2, on which a sample container 2-3 for holding a sample is erected, is moved by a rack transport line 2-18 to a sample dispensing position near a sample dispensing nozzle 2-4.

An incubator 2-5 is installed with a plurality of reaction containers 2-6, and has a configuration capable of rotational movement for moving each of the reaction containers 2-6 installed in the circumferential direction to a predetermined position.

A sample dispensing tip and reaction container transport mechanism 2-7 can move in three directions of an X-axis, a Y-axis, and a Z-axis, and move within a predetermined range of a sample dispensing tip and reaction container holder member 2-8, a reaction container stirring mechanism 2-9, a sample dispensing tip and reaction container waste hole 2-10, and a sample dispensing tip mounting position 2-11, and the incubator 2-5 to transport a sample dispensing tip and a reaction container.

A plurality of unused reaction containers and sample dispensing tips are installed on the sample dispensing tip and reaction container holder member 2-8. The sample dispensing tip and reaction container transport mechanism 2-7 moves to above the sample dispensing tip and reaction container holder member 2-8 and descends in the Z direction to grip an unused reaction container, and then rises and further moves to a predetermined position above the incubator 2-5, and descends to install the reaction container 2-6 at a corresponding position.

Next, the sample dispensing tip and reaction container transport mechanism 2-7 moves to above the sample dispensing tip and reaction container holder member 2-8 and descends to grip an unused sample dispensing tip, and then rises and moves to above the sample dispensing tip mounting position 2-11, and descends to install the sample dispensing tip at a corresponding position.

The sample dispensing nozzle 2-4 can rotate and move up and down, and rotates and moves to above the sample dispensing tip mounting position 2-11, and then descends to press-fit and load the sample dispensing tip into a tip of the sample dispensing nozzle 2-4. The sample dispensing nozzle 2-4 loaded with the sample dispensing tip moves to above the sample container 2-3 mounted on the transport rack 2-2, and then descends to aspirate a predetermined amount of a sample held in the sample container 2-3. The sample dispensing nozzle 2-4 that aspirated the sample moves to above the incubator 2-5, and then descends to discharge the aspirated sample into an unused reaction container 2-6 held in the incubator 2-5. When the sample discharge to the reaction container 2-6 is completed, the sample dispensing nozzle 2-4 moves to above the sample dispensing tip and reaction container waste hole 2-10, and drops an used sample dispensing tip into a disposal hole and discards it.

A plurality of reagent containers 2-19 are installed on a reagent disk 2-12. A reagent disk cover 2-13 is provided above the reagent disk 2-12, and an inside of the reagent disk 2-12 is kept at a predetermined temperature. A reagent disk cover opening portion 2-14 is provided in a part of the reagent disk cover 2-13. A reagent dispensing nozzle 2-15 can rotate and move up and down, and rotates and moves to above the opening portion 2-14 of the reagent disc cover 2-13 and descends to immerse a tip of the reagent dispensing nozzle 2-15 in a reagent in a predetermined reagent container 2-19 to aspirate a predetermined amount of the reagent. Then, the reagent dispensing nozzle 2-15 rises, and then rotates and moves to a predetermined position above the incubator 2-5 to discharge an aspirated reagent into the predetermined reaction container 2-6.

The reaction container 2-6 to which the sample and the reagent are discharged is moved to a predetermined position by rotation of the incubator 2-5, and is transported to the reaction container stirring mechanism 2-9 by the sample dispensing tip and reaction container transport mechanism 2-7. The reaction container stirring mechanism 2-9 stirs and mixes the sample and the reagent in the reaction container by applying a rotary motion to the reaction container 2-6. The reaction container 2-6 after stirring is returned to a predetermined position of the incubator 2-5 by the sample dispensing tip and reaction container transport mechanism 2-7.

A reaction solution aspiration nozzle 2-16 can rotate and move up and down, and moves to above the reaction container 2-6 after the sample and the reagent are dispensed and stirred and a predetermined reaction time has passed in the incubator 2-5, and descends and aspirates a reaction solution in the reaction container 2-6. The reaction solution aspirated by the reaction solution aspiration nozzle 2-16 is analyzed by at least one detecting unit 2-17.

The reaction container 2-6 from which the reaction solution is aspirated is moved to a predetermined position by the rotation of the incubator 2-5, and is moved from the incubator 2-5 to above the sample dispensing tip and reaction container waste hole 2-10 by the sample dispensing tip and reaction container transport mechanism 2-7, and then is discarded from the disposal hole.

In the analysis module shown in FIG. 2, in order to be able to operate a plurality of different measurement sequences, in addition to an operation of one position counterclockwise, operation patterns such as one position clockwise and three positions counterclockwise may be prepared as operation patterns of the incubator 2-5, for example, as shown in FIG. 5 of Patent Literature 2.

FIG. 3 is a block diagram illustrating various functions of the computer 1-10 for the analysis module in the present embodiment. These various functions can be implemented by the central processing unit (CPU) built in the computer that executes a predetermined program stored in the storage unit, etc. Arrows in the figure denote a transmission direction of information between functional blocks. Information transmission is, for example, message communication. A request input unit 3-1 has a function in which the analysis module 2-1 shown in FIG. 2 receives a measurement request for a sample on a sample rack. A rack managing unit 3-2 manages the measurement request received by an input unit 3-1. A planning unit 3-3 schedules a measurement of the sample in analysis module 2-1. A mechanism control unit 3-4 operates various mechanisms of the analysis module according to the schedule planned by the planning unit 3-3. A result output unit 3-5 notifies a host system such as the computer for overall management 1-8 of a measurement result corresponding to the measurement request. A request analyzing unit 3-6 receives the measurement request input to the request input unit 3-1, classifies whether the measurement item is a short measurement item or a standard measurement item, and obtains a ratio of the short measurement item and the standard measurement item in the measurement request. Here, the ratio is a proportion of the short measurement item to the standard measurement item. Unique functions of the automatic analyzer of the present embodiment are functions of the request analyzing unit 3-6 and the planning unit 3-3 in FIG. 3.

Hereinafter, details of the two functions of the request analyzing unit and the planning unit will be described with reference to FIGS. 4 and 5. FIG. 4 is a flowchart illustrating processing flows of the request analyzing unit 3-6. First, the measurement request is received from the request input unit 3-1 (step 4-1).

It is confirmed whether a measurement item of a measurement sequence of the received measurement request is a short measurement item or a standard measurement item, and based on a result thereof, the ratio of the short measurement item and the standard measurement item is calculated (step 4-2). Then, it is confirmed whether the calculated ratio has changed (step 4-3), and if there is a change, the ratio is recorded as an empty cycle setting for the short measurement, and the empty cycle setting for the short measurement is updated (step 4-4). If there is no change, the processing flows end immediately and wait for a next request reception. By updating this setting, the request analyzing unit 3-6 outputs an updated empty cycle ratio for the short measurement. Here, an empty cycle means a cycle without measurement in the analysis schedule, and a cycle set to shorten a turnaround time of a STAT item is referred to as an empty cycle for the short measurement.

FIG. 5 is a flowchart illustrating processing flows of the planning unit 3-3. First, a measurement request collated with the rack 2-2 is received from the rack managing unit 3-2 (step 5-1). Then, the above-mentioned empty cycle ratio for the short measurement, which is an analysis result of the processing flows shown in FIG. 4 of the request analyzing unit 3-6, is acquired (step 5-2). Depending on the empty cycle ratio for the short measurement and a current number of schedules, it is determined whether a next analysis schedule is an empty cycle (step 5-3).

If the next analysis schedule is an empty cycle (yes in step 5-4), the empty cycle for the short measurement is scheduled (step 5-8). If the next analysis schedule is not an empty cycle (no), a measurement item based on the measurement request is scheduled (step 5-5) and the number of the schedules in the analysis schedule is counted up (step 5-6). Then, it is confirmed whether all schedules of received measurement requests have been completed (step 5-7), and if it has been not completed (no), the same process is executed from step 5-3 to process a next schedule. If all the schedules of the received measurement requests have been completed (yes), the processing flows end.

Next, an effect of the automatic analyzer of the present embodiment will be described in comparison with the related art. FIG. 6 shows a comparison of measurement sequences of an automatic analyzer in the related art and the automatic analyzer of the present embodiment in upper and lower stages. That is, FIG. 6 is an example of, when a measurement item A which is a standard measurement item is measured continuously, comparing an elapsed time until a measurement result of a measurement item B which is a short measurement item is output when an empty cycle without measurement is scheduled according to the configuration of the present embodiment with an elapsed time according to the related art when the measurement item B which is the short measurement item is measured. In both cases, an examination request contains 5 items, examination 1 to examination 5. Contents of analysis processes a to e of the measurement items A and B are shown in a lower right portion.

As described above, the measurement item A shown in FIG. 6 is an example of the measurement sequence of the standard measurement item, and the measurement item B is an example of the measurement sequence of the short measurement item. Regarding the analysis processes a to e, a denotes sample sampling, b denotes first-stage reagent aspiration/addition, c denotes magnetic particle reagent aspiration/addition, d denotes reaction solution stirring, e denotes electrical signal measurement, and f and g denote incubation. By making different combinations of these analysis processes, the measurement sequences of the measurement item A and measurement item B are configured. In the figure, z denotes empty cycle (no measurement). One operation of the analysis processes a to e cannot be operated at the same timing for a plurality of measurement items.

As shown in the upper stage of FIG. 6, in the case of the related art, in the measurement item B of the examination 4, there is a waiting time until time 6 on a horizontal axis is reached. That is, when the measurement item A which is the standard measurement item is continuously measured, a start of a measurement of the measurement item B which is a short measurement item may be awaited. However, as shown in the lower stage of FIG. 6, in the case of the configuration of the present embodiment, by a schedule without measurement due to an empty cycle (z) before a start of the measurement item A of the examination 3, the measurement item B of the examination 4 can start the measurement from time 5 earlier than time 6 on the horizontal axis, and thus an elapsed time t2 until the measurement result of the measurement item B is output is shorter than an elapsed time t1 in the case of the related art (t2<t1).

As described above, the automatic analyzer and the automatic analysis method of the present embodiment can shorten the turnaround time of the short measurement item and contribute to an early diagnosis.

Subsequently, examples of an empty cycle schedule proportion setting, priority setting, and presence/absence setting screen of the automatic analyzer of the present embodiment will be described with reference to FIGS. 7-9. These setting screens can be displayed as a Graphical User Interface (GUI) on the display unit 1-11 under control of the computer for overall management 1-8 in FIG. 1, for example.

FIG. 7 is an example of an empty cycle schedule proportion setting screen. On an empty cycle schedule proportion setting screen 7-1, a proportion of an empty cycle can be input in a text box 7-2 using a cancel button 7-3 and an update button 7-4. It is also possible to determine the empty cycle schedule proportion based on a condition of the proportion (%) of the empty cycle set on a GUI screen regardless of instructions from the computer for overall management 1-8.

FIG. 8 is an example of an empty cycle schedule priority setting screen. On an empty cycle schedule priority setting screen 8-1, a priority condition in a priority condition 8-2 is selected by a condition selection radio button 8-3. It is also possible to determine whether to prioritize an empty cycle schedule based on the priority condition set by a user on such a GUI screen regardless of the instructions from the computer for overall management 1-8.

FIG. 9 is an example of an empty cycle schedule presence/absence setting screen for each measurement item. On an empty cycle schedule presence/absence setting screen 9-2, a measurement item name 9-2, a combo box for selection 9-3, a cancel button 9-4, and an update button 9-5 are displayed. In the measurement item name 9-2, measurement items A to E can be selected. In this way, presence/absence of empty cycle schedules for the measurement items may be determined based on conditions set on such a GUI screen regardless of the instructions of the computer for overall management 1-8.

Although the preferred embodiment of the invention has been described in detail with reference to the drawings, the invention is not limited to the above-described embodiment and includes various modifications. For example, the embodiment described above has been described in detail for better understanding of the invention, and the invention is not necessarily limited to those including all configurations described above.

In addition, for example, as shown in FIG. 2, the analysis module serving as the analyzing unit includes a plurality of detection units 2-17 that operate the measurement sequence to perform analysis, and can set the analysis schedule for different measurement sequences for each of the plurality of detection units. That is, different analysis schedules can be set for a first reaction container to be transported to a first detecting unit and a second reaction container to be transported to a second detecting unit. For example, an analysis schedule may be set for the first reaction container and no analysis schedule may be set for the second reaction container. In addition, the number of physical detection units in the analysis module is not limited, and the first detecting unit and the second detecting unit may be logically assigned and different analysis schedules may be set for each. In other words, the analyzing unit of the automatic analyzer includes the plurality of detection units, it is possible to specify that the analysis schedule of the different measurement sequences is executed for each of the plurality of detecting units, and contents of the specified measurement sequences are saved in the storage unit of the computer 1-10.

Furthermore, although the explanation is based on an example of creating a program of the CPU for implementing a part or all of the configurations, functions, and computer for overall management described above, it is needless to say that a part or all of them may be implemented by hardware, for example, by designing an integrated circuit. In other words, all or a part of functions of a processing unit may be implemented by an integrated circuit such as an application specific integrated circuit (ASIC) or a field programmable gate array (FPGA) instead of the program.

REFERENCE SIGN LIST 1-1: sample rack loading unit
1-2: ID reading unit
1-3: transport line
1-4: reexamination transport line
1-5: sample rack collecting unit
1-6: calibrator storing unit
1-7, 2-1: analysis module
1-8: computer for overall management
1-9, 1-10: computer
1-11: display unit
1-12: operation unit
1-13: external network
2-2: rack
2-3: sample container
2-4: sample dispensing nozzle
2-5: incubator
2-6: reaction container
2-7: sample dispensing tip and reaction container transport mechanism
2-8: sample dispensing tip and reaction container holder member
2-9: reaction container stirring mechanism
2-10: sample dispensing tip and reaction container waste hole
2-11: sample dispensing tip mounting position
2-12: reagent disk
2-13: reagent disk cover
2-14: reagent disk cover opening portion
2-15: reagent dispensing nozzle
2-16: reaction solution aspiration nozzle
2-17: detecting unit
2-18: rack transport line
2-19: reagent container
7-1: empty cycle schedule proportion setting screen
7-2: text box for inputting empty cycle proportion
7-3, 8-4, 9-4: cancel button
7-4, 8-5, 9-5: update button
8-1: empty cycle schedule priority setting screen
8-2: priority condition
8-3: radio button for condition selection
8-5: update button
9-1: empty cycle schedule presence/absence setting screen
9-2: measurement item name
9-3: combo box for selection

The invention claimed is:

1. An automatic analyzer comprising:
an incubator that includes a plurality of holding portions holding a plurality of reaction containers, which contain a reaction of a mixed solution of a sample and a reagent;
a receiving unit configured to receive analysis information relating to a measurement item of the sample;
a transport unit configured to transport each of the reaction containers to the holding portion;
an analyzing unit configured to perform analysis by operating a measurement sequence of a series of operations according to a predetermined reaction time of each of the reaction containers containing the mixed solution to which a predetermined reagent is added at a predetermined timing based on the analysis information; and
a central processing unit (CPU) configured to:
create an analysis schedule to be performed by the analyzing unit based on the analysis information,
for a plurality of different measurement items, determine whether each measurement sequence of the measurement items is a short measurement item or a standard measurement item, the short measurement item being a measurement item that requires a short period of time for a reaction, and the standard measurement item being a measurement item that requires a standard period of time for a reaction, and
determine whether to add an empty cycle into the analysis schedule, and upon determining to add the empty cycle, add the empty cycle before the measurement sequence of the short measurement item,
wherein the empty cycle is a cycle of the automatic analyzer in which no operations of either the short measurement item or the standard measurement item are performed.

2. The automatic analyzer according to claim 1,
wherein the CPU is configured to:
analyze, in a case where a new measurement request is received, the measurement request, calculate a ratio of the short measurement item and the standard measurement item, and update a setting of an empty cycle of the analysis schedule based on the calculated ratio, and
create the analysis schedule according to the calculated ratio.

3. The automatic analyzer according to claim 2,
wherein the ratio is a proportion of the short measurement item with respect to the standard measurement item.

4. The automatic analyzer according to claim 3, further comprising:
a display unit that displays a GUI screen,
wherein the proportion is settable using the GUI screen.

5. The automatic analyzer according to claim 3, further comprising:
a display unit that displays a GUI screen,
wherein a condition regarding whether or not a setting of the empty cycle is prioritized is selectable using the GUI screen.

6. The automatic analyzer according to claim 3, further comprising:
a display unit that displays a GUI screen,
wherein the presence or absence of a schedule of the empty cycle is settable depending on the different measurement items using the GUI screen.

7. The automatic analyzer according to claim 1,
wherein the analyzing unit includes a plurality of detecting units that perform analysis by operating the measurement sequence, and
wherein an analysis schedule of different measurement sequences for the respective detecting units is created.

* * * * *